US008971017B1

(12) United States Patent
Nakamura

(10) Patent No.: US 8,971,017 B1
(45) Date of Patent: Mar. 3, 2015

(54) MULTILAYER CERAMIC CAPACITOR

(71) Applicant: Murata Manufacturing Co., Ltd., Nagaokakyo-shi, Kyoto-fu (JP)

(72) Inventor: Tomoyuki Nakamura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/527,922

(22) Filed: Oct. 30, 2014

(51) Int. Cl.
*H01G 4/06* (2006.01)
*H01G 4/228* (2006.01)
*H01G 4/12* (2006.01)
*H01G 4/30* (2006.01)

(52) U.S. Cl.
CPC ............. *H01G 4/1227* (2013.01); *H01G 4/30* (2013.01)
USPC ..................... 361/311; 361/301.4; 361/321.1; 361/321.2

(58) Field of Classification Search
None
See application file for complete search history.

(56) References Cited

U.S. PATENT DOCUMENTS

| 2008/0014430 A1* | 1/2008 | Onoue et al. | 428/304.4 |
| 2008/0212258 A1* | 9/2008 | Fukui et al. | 361/305 |
| 2012/0162858 A1* | 6/2012 | Tanaka et al. | 361/321.4 |
| 2013/0286538 A1* | 10/2013 | Kim et al. | 361/303 |
| 2014/0049875 A1* | 2/2014 | Kim et al. | 361/321.2 |
| 2014/0071586 A1* | 3/2014 | Park et al. | 361/301.4 |

FOREIGN PATENT DOCUMENTS

JP 06-260023 A 9/1994

* cited by examiner

*Primary Examiner* — Jinhee Lee
*Assistant Examiner* — Dion R Ferguson
(74) *Attorney, Agent, or Firm* — Keating & Bennett, LLP

(57) ABSTRACT

A multilayer ceramic capacitor includes a ceramic multilayer body including dielectric layers and inner electrodes stacked on top of one another with the dielectric layers interposed between a corresponding pair of the inner electrodes. The dielectric layers each include a perovskite-type compound including Ba and Ti. A boundary layer including Mg and Mn is located at an interface between an outermost inner electrode and an outermost dielectric layer. The outermost inner electrode is located at an outermost position of the inner electrodes in a direction in which the inner electrodes are stacked. The outermost dielectric layer is located outside the outermost inner electrode. A proportion in which the boundary layer is present at the interface is about 69% or more. A continuity of the outermost inner electrode is about 60% or more.

15 Claims, 11 Drawing Sheets

MULTILAYER CERAMIC CAPACITOR

BACKGROUND OF THE INVENTION

1. Field of the Invention

The present invention relates to multilayer ceramic capacitors and specifically to a multilayer ceramic capacitor that includes a ceramic multilayer body (i.e., capacitor main body) including a plurality of dielectric ceramic layers each including a perovskite-type compound including Ba and Ti, and a plurality of inner electrodes stacked on top of one another with each of the dielectric ceramic layers interposed between a corresponding pair of the inner electrodes.

2. Description of the Related Art

Hitherto, as the sizes and weights of electronic devices have been reduced, compact, high-capacitance multilayer ceramic capacitors have been widely used. A widely known example of such multilayer ceramic capacitors is a multilayer ceramic capacitor including a multilayer body constituted by a plurality of dielectric layers and by a plurality of inner electrodes each disposed at a corresponding interface between a pair of the adjoining dielectric layers, and outer electrodes disposed on the outer surface of the multilayer body so as to be electrically connected to the inner electrodes.

There has been proposed a multilayer ceramic capacitor shown in FIG. 9 as an example of the above-described multilayer ceramic capacitor, which includes a ceramic multilayer body (i.e., capacitor main body) 110 constituted by a plurality of dielectric layers (dielectric ceramic layers) 111 and by a plurality of inner electrodes 112 each disposed at a corresponding interface between a pair of the adjoining dielectric layers 111, and a pair of outer electrodes 113a and 113b disposed on the respective end surfaces of the ceramic multilayer body 110 so as to be electrically connected to the inner electrodes 112 that are alternately exposed at both end surfaces.

In Japanese Unexamined Patent Application Publication No. 6-260023, a compact, high-capacitance capacitor including a dielectric layer whose relative dielectric constant does not greatly vary with temperature is described. The dielectric layer is formed of a composition including 100 molar parts of $BaTiO_3$, 1 to 7 molar parts of $CaZrO_3$, 0.5 to 1.5 molar parts of NiO, 0.1 to 0.3 molar parts of MnO, and 0.2 to 0.7 molar parts of $Re_2O_3$.

However, in the multilayer ceramic capacitor described in Japanese Unexamined Patent Application Publication No. 6-260023 having the above-described structure, moisture may enter the ceramic multilayer body (i.e., capacitor main body) through gaps between the inner electrodes and the dielectric layers and, specifically, through a gap between one of the inner electrodes which is located at the outermost position in a direction in which the inner electrodes are stacked (hereinafter, referred to as "outermost inner electrode") and the outermost dielectric layer located outside the outermost inner electrode, which deteriorates the characteristics of the multilayer ceramic capacitor.

SUMMARY OF THE INVENTION

Accordingly, preferred embodiments of the present invention provide a highly reliable multilayer ceramic capacitor that significantly reduces or prevents moisture from entering the ceramic multilayer body (i.e., capacitor main body).

According to a preferred embodiment of the present invention, a multilayer ceramic capacitor includes a ceramic multilayer body including a plurality of dielectric ceramic layers; and a plurality of inner electrodes stacked such that a respective one of the plurality of dielectric ceramic layers is interposed between an adjacent pair of the plurality of inner electrodes; and an outer electrode disposed on the ceramic multilayer body so as to be electrically connected to respective ones of the plurality of inner electrodes; wherein the plurality of dielectric ceramic layers include a perovskite-type compound including Ba and Ti; a boundary layer including Mg and Mn is provided between an outermost inner electrode of the plurality of inner electrodes and an outermost dielectric ceramic layer of the plurality of dielectric ceramic layers, the outermost inner electrode being located at an outermost position of the plurality of inner electrodes in a direction in which the plurality of inner electrodes are stacked, the outermost dielectric ceramic layer being located outside of the outermost inner electrode.

Preferably, a proportion P1 obtained by a formula $P1=X1/X2\times100$ is about 69% or more, where X1 represents a total of all lengths of discontinuous portions defining the boundary layer, and X2 represents a total of all lengths of discontinuous portions defining the outermost inner electrode.

Preferably, a proportion P2 obtained by a formula $P2=(1-X3/X4)\times100$ is about 60% or more, where X3 represents a total of lengths of portions located along the outermost inner electrode in which the outermost inner electrode is absent and located between the discontinuous portions defining the outermost inner electrode, and X4 represents a dimension between left and right outermost end points of the discontinuous portions defining the outermost inner electrode.

Preferably, a proportion P3 obtained by a formula $P3=N1/N2\times100$ is about 39% or more, where N1 represents a total number of locations at which the outermost inner electrode is absent and Si is present, and N2 represents a total number of locations at which the outermost inner electrode is absent.

Preferably, an average thickness of each of the inner electrodes is about 0.4 μm or less.

Preferably, an average thickness of each of the dielectric ceramic layers is about 0.5 μm or less.

According to another preferred embodiment of the present invention, a multilayer ceramic capacitor includes a ceramic multilayer body including a plurality of dielectric ceramic layers; and a plurality of inner electrodes including Ni and being stacked such that a respective one of the plurality of dielectric ceramic layers is interposed between an adjacent pair of the plurality of inner electrodes; and an outer electrode disposed on the ceramic multilayer body so as to be electrically connected to respective ones of the plurality of inner electrodes; wherein the dielectric ceramic layers include a perovskite-type compound including Ba and Ti; a boundary layer including Mg, Mn and Ni is provided between an outermost inner electrode of the plurality of inner electrodes and an outermost dielectric ceramic layer of the plurality of dielectric ceramic layers, the outermost inner electrode being located at an outermost position of the plurality of inner electrodes in a direction in which the plurality of inner electrodes are stacked, the outermost dielectric ceramic layer being located outside the outermost inner electrode; a proportion P1 obtained by a formula $P1=X1/X2\times100$ is about 69% or more, where X1 represents a total of all lengths of discontinuous portions defining the boundary layer, and X2 represents a total of all lengths of discontinuous portions defining the outermost inner electrode; a proportion P2 obtained by a formula $P2=1-X3/X4)\times100$ is about 60% or more, where X3 represents a total of lengths of portions located along the outermost inner electrode in which the outermost inner electrode is absent and located between the discontinuous portions defining the outermost inner electrode, and X4 represents a dimension between left and right outermost end points of the discontinuous portions defining the outermost inner electrode; a molar ratio (Mn/Mg) of the Mn content to the Mg content in the boundary layer is in a range of about 0.005 to about 0.7; and a molar ratio ((Mg+Mn)/Ni) of the total content of Mg and Mn to the Ni content in the boundary layer is in a range of about 0.1 to about 0.8.

According to a further preferred embodiment of the present invention, a multilayer ceramic capacitor includes a ceramic multilayer body including a plurality of dielectric ceramic layers; and a plurality of inner electrodes stacked such that a respective one of the plurality of dielectric ceramic layers is interposed between an adjacent pair of the plurality of inner electrodes; and an outer electrode disposed on the ceramic multilayer body so as to be electrically connected to respective ones of the plurality of inner electrodes; wherein a boundary layer including Mg and Mn is provided between an outermost inner electrode of the plurality of inner electrodes and an outermost dielectric ceramic layer of the plurality of dielectric ceramic layers, the outermost inner electrode being located at an outermost position of the plurality of inner electrodes in a direction in which the plurality of inner electrodes are stacked, the outermost dielectric ceramic layer being located outside the outermost inner electrode; a proportion P1 obtained by a formula P1=X1/X2×100 is about 69% or more, where X1 represents a total of all lengths of discontinuous portions defining the boundary layer, and X2 represents a total of all lengths of discontinuous portions defining the outermost inner electrode; a proportion P2 obtained by the formula P2=(1−X3/X4)×100 is about 60% or more, where X3 represents a total of lengths of portions located along the outermost inner electrode in which the outermost inner electrode is absent and located between the discontinuous portions defining the outermost inner electrode, and X4 represents a dimension between left and right outermost end points of the discontinuous portions defining the outermost inner electrode; at least one of the plurality of dielectric ceramic layers other than the outermost dielectric ceramic layer includes a perovskite-type compound including Ba and Ti, and further including a rare earth element R, Mn, Mg, V, and Al; and contents of R, Mn, Mg, V, Al relative to 100 molar parts of Ti are set such that a content a of R in molar parts is about 0.7≤a≤about 1.1; a content b of Mn in molar parts is about 0.07≤b≤about 0.18; a content c of Mg in molar parts is about 1.0≤c≤about 1.7; a content d of V in molar parts is about 0.07≤d≤about 0.18; and a content e of Al in molar parts is about 0.26≤e≤about 0.52.

With various preferred embodiments of the present invention, highly reliable multilayer ceramic capacitors including a capacitor main body (i.e., ceramic multilayer body) having high moisture resistance are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are described below in order to explain the features of the present invention more in detail.

A dielectric ceramic raw material was prepared according to a non-limiting example of a preferred embodiment of the present invention as follows. A $BaCO_3$ powder and a $TiO_2$ powder each having a purity of about 99% by weight or more were mixed together in such a manner that Ba:Ti=about 1:1. The resulting powder mixture was wet-blended using a ball mill so as to form a homogeneous dispersion. The dispersion was dried to prepare a blended powder. The blended powder was calcined at about 1,000° C. to prepare a $BaTiO_3$ powder having an average particle diameter of about 150 nm, which was used as a main component.

A MgO powder, an $Al_2O_3$ powder, a $V_2O_5$ powder, a $MnO_2$ powder, a $Dy_2O_3$ powder, and a $SiO_2$ powder were prepared as auxiliary components and added to the above-described powder that served as a main component by weighing these powders in such a manner that the amounts of Mg, Al, V, Mn, Dy, and Si relative to 100 molar parts of Ti were set to specific values (Mg: about 1.3 molar parts, Al: about 0.5 molar parts, V: about 0.1 molar parts, Mn: about 0.1 molar parts, Dy: about 1.0 molar parts, and Si: about 1.5 molar parts). Thus, a mixed powder was prepared. The mixed powder was wet-blended using a ball mill so as to form a homogeneous dispersion. The dispersion was dried to prepare a dielectric ceramic raw material.

Additionally, additive amounts of auxiliary components were preferably selected such that the contents of the rare earth element R, Mn, Mg, V, and Al relative to 100 molar parts of Ti are as follows:

the content a of R in molar parts is 0.7≤a≤1.1;
the content b of Mn in molar parts is 0.07≤b≤0.18;
the content c of Mg in molar parts is 1.0≤c≤1.7;
the content d of V in molar parts is 0.07≤d≤0.18; and
the content e of Al in molar parts is 0.26≤e≤0.52.

Note that the above is a non-limiting example of a preferred embodiment of the present invention and is not limiting in any way of the present invention.

In this preferred embodiment of the present invention, a multilayer ceramic capacitor that achieves even more superior reliability is provided.

Figure 1:
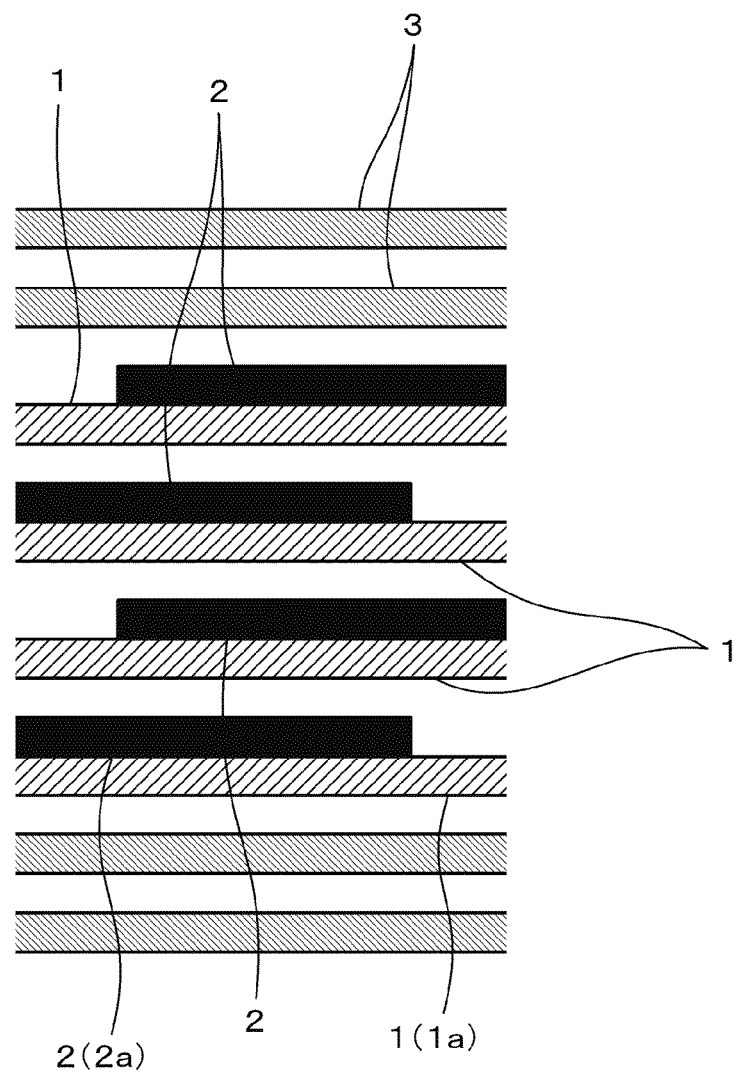
FIG. 1 is a diagram used for explaining a method for producing a multilayer ceramic capacitor according to a preferred embodiment of the present invention.

FIG. 1 is an exploded diagram of a multilayer body that defines a capacitor main body (i.e., ceramic multilayer body) 10 after being fired in the production of the multilayer ceramic capacitor according to a preferred embodiment of the present invention. The multilayer body includes ceramic green sheets 1 on which the respective inner electrode patterns 2 are provided and ceramic green sheets 3 for outer layers on which the inner electrode patterns are not provided.

A larger amount of $SiO_2$ was added to a dielectric ceramic raw material used to prepare the ceramic green sheets 3 for outer layers than to that used to prepare the ceramic green sheets 1 in such a manner that a ratio of the Si content in the dielectric ceramic raw material used to prepare the ceramic green sheets 3 for outer layers to that in the dielectric ceramic raw material used to prepare the ceramic green sheets 1 (1.5 molar parts) was equal or substantially equal to the ratio shown by "Si outer layer/inner layer ratio" in Table 1A or 1B. Specifically, for example, in preparation of Test material No. 8 shown in Table 1A, a larger amount, that is, about 1.5× 1.2=1.8 molar parts, of $SiO_2$ preferably was added to the dielectric ceramic raw material used to prepare the ceramic green sheets 3 for outer layers than to that used to prepare the ceramic green sheets 1.

However, among Test material Nos. 1 to 18 shown in Tables 1A and 1B which were prepared in the present preferred embodiment, in Test material No. 1 that was a comparative example that did not satisfy the requirements of the present invention, the $SiO_2$ content in the dielectric ceramic raw material used to prepare the ceramic green sheets 3 for outer layers was set substantially equal to that in the dielectric ceramic raw material used to prepare the ceramic green sheets 1.

In Test material No. 2, which was a comparative example that did not satisfy the requirements of the present invention, MgO was not added (i.e., the Mg content was set to 0 molar parts) to a dielectric ceramic raw material used to prepare a bottom ceramic green sheet 1 (1a) on which a bottom inner electrode pattern 2 (2a) was printed and to a dielectric ceramic raw material used to prepare the ceramic green sheets 3 for outer layers. This is to prepare a test material in which a boundary layer including Mg was not in contact with an outermost inner electrode.

In Test material No. 3, which was a comparative example that did not satisfy the requirements of the present invention, $MnO_2$ was not added (i.e., the Mn content was set to 0 molar parts) to a dielectric ceramic raw material used to prepare a bottom ceramic green sheet 1 (1a) on which a bottom inner electrode pattern 2 (2a) was printed and to a dielectric ceramic raw material used to prepare the ceramic green sheets 3 for outer layers. This is to prepare a test material in which a boundary layer including Mn was not in contact with an outermost inner electrode.

A polyvinyl butyral-based binder, a plasticizer, and ethanol defining an organic solvent were added to the above-described dielectric ceramic raw material. The resulting mixture was wet-blended using a ball mill to prepare a ceramic slurry. The ceramic slurry was formed into a sheet by a lip method. Thus, substantially rectangular ceramic green sheets were prepared.

A Ni powder having an average particle diameter of about 200 nm (about 80 nm for Test material Nos. 13 to 18 shown in Tables 1A and 1B) was prepared. Ethyl cellulose was dissolved in terpineol to prepare an organic vehicle. The Ni powder was dispersed in the organic vehicle using a three-roller mill to prepare a conductive paste, which was used to form inner electrodes.

The conductive paste containing Ni defining and serving as a conductive component was screen-printed on each ceramic green sheet to form a conductive paste film (inner electrode pattern) that was to be formed into an inner electrode. Then, 300 ceramic green sheets each including the inner electrode pattern formed thereon were stacked on top of one another so that the inner electrode patterns were exposed alternately at both end surfaces of the multilayer body. Ceramic green sheets on which the inner electrode pattern was not formed were stacked on the top and bottom surfaces of the multilayer body in a direction in which the dielectric layers were stacked. Thus, a green multilayer body that was to be formed into a capacitor main body (i.e., ceramic multilayer body) was prepared. The conductive component of the inner electrodes is not particularly limited but is preferably composed mainly of Ni or a Ni alloy, for example.

The green multilayer body was heated at about 350° C. for about 3 hours in a N2 atmosphere to burn the binder, subsequently heated at a rate of temperature rise of about 100° C./min, and kept at the maximum temperature of about 1,200° C. for about 10 minutes. Then, the resulting multilayer body was fired in a reducing atmosphere containing an $H_2$—$N_2$—$H_2O$ gas having the oxygen partial pressure shown in Table 1A or 1B. Thus, a sintered ceramic multilayer body, that is, a capacitor main body, was prepared.

A Cu paste containing a glass frit was applied to both end surfaces of the capacitor main body and burned at about 800° C. in a $N_2$ atmosphere to form outer electrodes that were electrically connected to the inner electrodes. Thus, a multilayer ceramic capacitor (each of Test material Nos. 1 to 18 shown in Tables 1A and 1B) was prepared.

Figure 2:
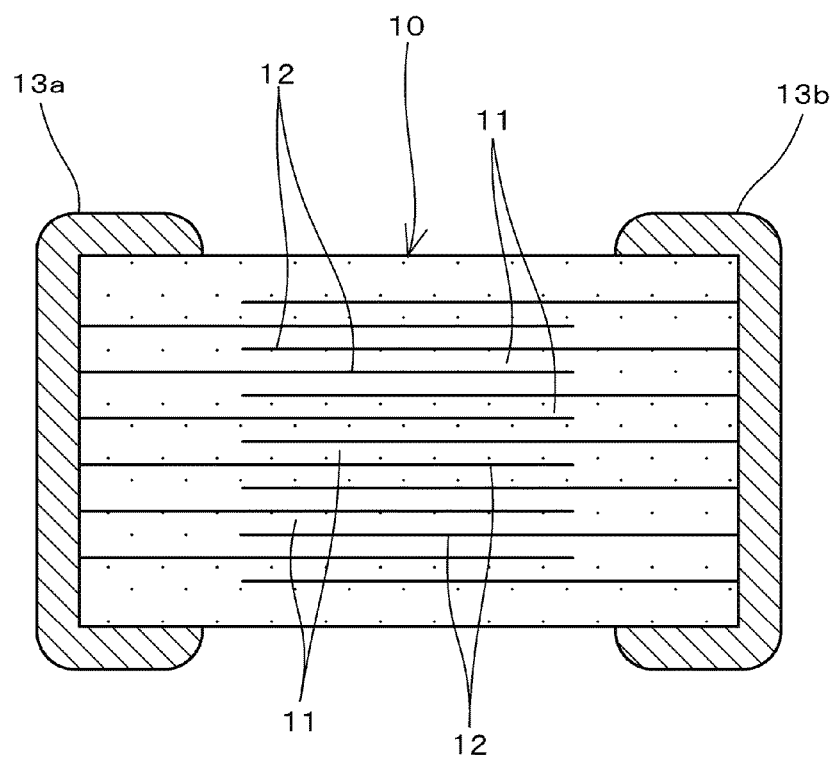
FIG. 2 is a cross-sectional view of a multilayer ceramic capacitor according to a preferred of the present invention, which illustrates the internal structure of the multilayer ceramic capacitor.
Figure 3:
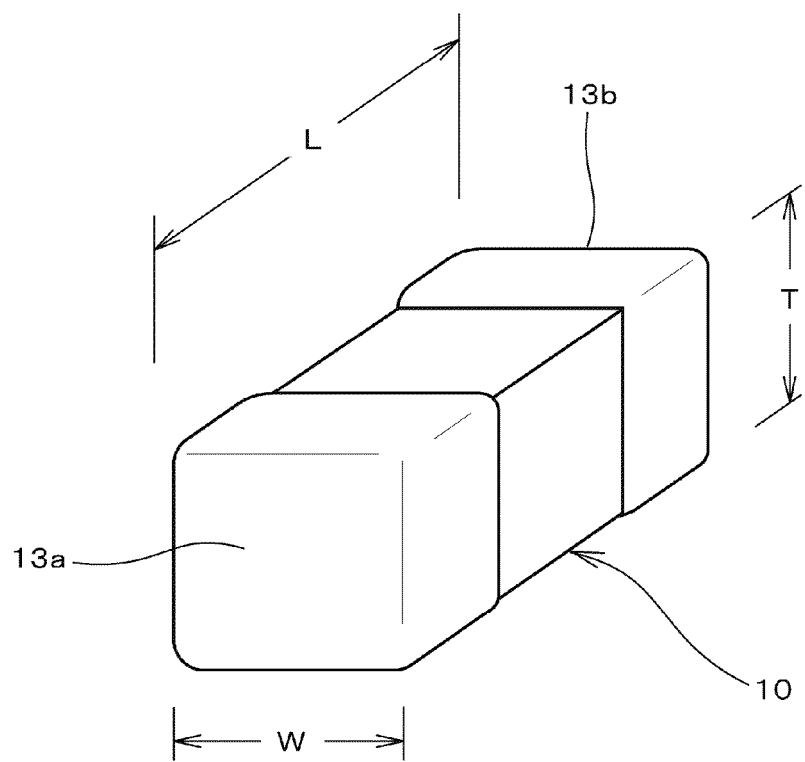
FIG. 3 is a perspective view of a multilayer ceramic capacitor according to a preferred embodiment of the present invention, which illustrates the structure of the multilayer ceramic capacitor.

As shown in FIGS. 2 and 3, this multilayer ceramic capacitor includes a ceramic multilayer body (i.e., capacitor main body) 10 including a plurality of dielectric layers (dielectric ceramic layers) 11 that are stacked on top of one another and by a plurality of inner electrodes 12 each disposed at a corresponding interface between a pair of the adjoining dielectric layers 11 and a pair of outer electrodes 13a and 13b disposed on the respective end surfaces of the ceramic multilayer body 10 so as to be electrically connected to the inner electrodes 12 exposed alternately at both end surfaces.

Although in this preferred embodiment, all of the inner electrodes 12 preferably are exposed alternately at both end surfaces of the ceramic multilayer body 10, portions of the adjacent inner electrodes 12 via the dielectric ceramic layer 11 may be exposed at the same end surface thereof. For example, the outermost inner electrodes located at the outermost position in a stacking direction may preferably be electrically connected to the same outer electrode to which the adjacent inner electrodes 12 via the dielectric ceramic layer 11 are electrically connected.

The outline dimensions of the multilayer ceramic capacitor (including the outer electrodes) were as follows: length L=about 1.0 mm, width W=about 0.5 mm, and height T=about 0.5 mm.

Tables 1A and 1B show the average thickness of the dielectric layers each interposed between a corresponding pair of the inner electrodes and the average thickness of the inner electrodes.

In the obtained multilayer ceramic capacitor described above, after removing the outer electrodes and the outermost dielectric ceramic layers located outside the outermost inner electrodes of the multilayer ceramic body, the multilayer ceramic body was subjected to the dissolution treatment by acid and inductively-coupled plasma (ICP) atomic emission spectroscopy was conducted. As a result, it was confirmed that the composition of the multilayer ceramic body except the Ni component of the inner electrodes corresponded to the composition at the time of blending the dielectric ceramic raw material.

Figure 4:
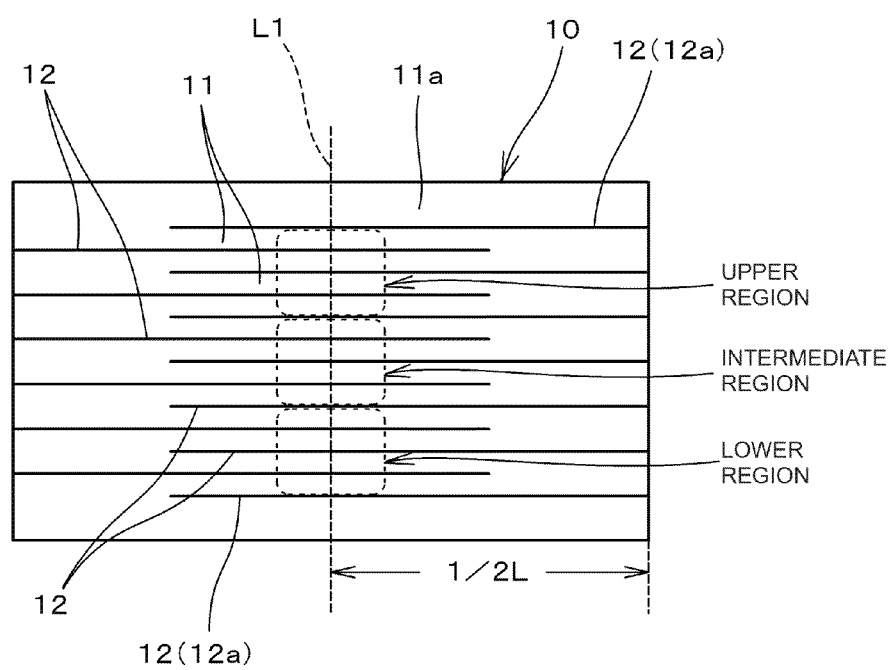
FIG. 4 is a diagram used for explaining a method of measuring the thicknesses of the inner electrodes and the dielectric layers constituting a multilayer ceramic capacitor according to a preferred embodiment of the present invention.

The thicknesses of the inner electrodes of each ground test material were measured as follows. As shown in FIG. 4, a straight line L1 was drawn at a substantially intermediate position of the LT-ground end surface of each test material in the L-direction so as to intersect the inner electrodes 12 at substantially right angles. Three samples were prepared for each of the test materials shown in Tables 1A and 1B. A portion of each sample in which the inner electrodes 12 were

TABLE 1A

| Test material No. | Si outer layer/ inner layer ratio | Oxygen partial pressure for firing $\log(PO_2/MPa)$ | Average thickness of dielectric layers μm | Average thickness of inner electrodes μm | Proportion in which boundary layer was present | Continuity of inner electrodes | Proportion of Si-containing segregated substance | Moisture resistance test 4 V | 6.3 V |
|---|---|---|---|---|---|---|---|---|---|
| *1 | 1 | −9.80 | 0.9 | 0.7 | — | 51% | 4% | 456/1500 | — |
| *2 | 1.4 | −8.84 | 0.9 | 0.7 | — | 79% | 35% | 689/1500 | — |
| *3 | 1.6 | −8.86 | 0.9 | 0.7 | — | 75% | 43% | 789/1500 | — |
| *4 | 1.02 | −9.06 | 0.9 | 0.7 | 20% | 53% | 5% | 105/1500 | — |
| *5 | 1.03 | −9.02 | 0.9 | 0.7 | 61% | 55% | 7% | 14/1500 | — |
| *6 | 1.9 | −9.02 | 0.9 | 0.7 | 72% | 54% | 57% | 6/1500 | — |
| 7 | 1.05 | −9.00 | 0.9 | 0.7 | 69% | 60% | 10% | 0/1500 | 9/1500 |
| 8 | 1.2 | −8.88 | 0.9 | 0.7 | 85% | 88% | 28% | 0/1500 | 4/1500 |
| 9 | 1.4 | −8.94 | 0.9 | 0.7 | 74% | 72% | 39% | 0/1500 | 0/1500 |
| 10 | 1.5 | −8.92 | 0.9 | 0.7 | 79% | 74% | 42% | 0/1500 | 0/1500 |
| 11 | 2 | −8.80 | 0.9 | 0.7 | 92% | 85% | 65% | 0/1500 | 0/1500 |
| 12 | 2.3 | −8.78 | 0.9 | 0.7 | 91% | 92% | 78% | 0/1500 | 0/1500 |
| 13 | 1.2 | −8.80 | 0.5 | 0.5 | 76% | 79% | 26% | 0/1500 | 8/1500 |
| 14 | 1.6 | −8.60 | 0.5 | 0.5 | 81% | 78% | 51% | 0/1500 | 0/1500 |

Test material Nos. marked with * mean that the test materials are out of the scope of the present invention.

TABLE 1B

| Test material No. | Si outer layer/ inner layer ratio | Oxygen partial pressure for firing $\log(PO_2/MPa)$ | Average thickness of dielectric layers μm | Average thickness of inner electrodes μm | Proportion in which boundary layer was present | Continuity of inner electrodes | Proportion of Si-containing segregated substance | Moisture resistance test 4 V | 6.3 V | Thermal test |
|---|---|---|---|---|---|---|---|---|---|---|
| 15 | 1.3 | −8.82 | 0.9 | 0.2 | 82% | 71% | 25% | 0/1500 | 2/1500 | 0/50 |
| 16 | 1.8 | −8.84 | 0.9 | 0.2 | 89% | 75% | 59% | 0/1500 | 0/1500 | 0/50 |
| 17 | 1.3 | −8.90 | 0.9 | 0.4 | 78% | 72% | 32% | 0/1500 | 3/1500 | 0/50 |
| 18 | 1.7 | −8.88 | 0.9 | 0.4 | 87% | 78% | 53% | 0/1500 | 0/1500 | 0/50 |

Evaluations

[1] Analysis of Test Materials (1) Average Thicknesses of Inner Electrodes and Dielectric Layers (1-1) Average Thickness of Inner Electrodes The prepared multilayer ceramic capacitors (hereinafter, referred to as "test materials") were each inspected in the following manner.

Each of the samples was covered with a resin so that a plane (hereinafter, referred to as "LT-plane") defined by the longitudinal direction (hereinafter, referred to as "L-direction") and the thickness direction (hereinafter, referred to as "T-direction") was exposed.

The LT-plane of each test material was ground to about half the depth of the test material in the width direction (hereinafter, referred to as "W-direction") with a grinder, and thereby the ground surface, that is, the LT-plane, (hereinafter, referred to as "LT-ground end surface") was exposed. After grinding was completed, the ground surface was processed by ion milling in order to eliminate the rollover of the inner electrodes caused by grinding.

disposed was divided into three equal or substantially equal regions, that is, an upper region, an intermediate region, and a lower region.

In each of the three regions, five inner electrodes were randomly selected from the inner electrodes 12 except for the outermost inner electrodes 12 (12a), the thicknesses of the five inner electrodes were measured at positions at which the inner electrodes 12 intersected the straight line L1 at substantially right angles, and the average of the thicknesses was calculated. The thicknesses of the inner electrodes were measured using a scanning electron microscope.

In other words, the average thickness of the inner electrodes shown in Table 1A or 1B is the average of the thicknesses of the inner electrodes measured at 45 positions (3 samples×3 regions×5 inner electrodes). Note that, a position at which the thickness of the inner electrode was not able to be measured due to, for example, the absence of the inner electrode was excluded from the above-described measurement positions.

(1-2) Average Thickness of Dielectric Layers

In each of the above-described three regions, that is, the upper region, the intermediate region, and the lower region shown in FIG. 4, five dielectric layers were randomly selected from the dielectric layers 11, the thicknesses of the five dielectric layers were measured at positions at which the dielectric layers intersected the straight line L1 at right angles or substantially right angles, and the average of the thicknesses was calculated. The thicknesses of the dielectric layers were measured using a scanning electron microscope.

In other words, the average thickness of the dielectric layers shown in Table 1A or 1B is the average of the thicknesses of the dielectric layers measured at 45 positions (3 samples×3 regions×5 dielectric layers).

However, the following positions were excluded from the above-described measurement positions: the outermost dielectric layers located outside the outermost inner electrodes 12 (12a) in a direction in which the internal electrodes were stacked; and a position at which the thickness of the dielectric layer was not able to be measured because, for example, two or more dielectric layers were observed as a single dielectric layer due to the absence of the inner electrode.

(2) Determination of Boundary Layer, Continuity of the Outermost Inner Electrodes, and Proportion in which Si-Containing Segregated Substance is Present (2-1) Determination of Boundary Layer Each of the test materials was covered with a resin so that a plane (hereinafter, referred to as "WT-plane") defined by the W-direction and the T-direction was exposed.

The WT-plane of each of the test materials was ground to about half the depth of the test material in the L-direction with a grinder. After grinding was completed, the ground surface was processed by ion milling in order to eliminate the rollover of the inner electrodes caused by grinding.

Figure 5:
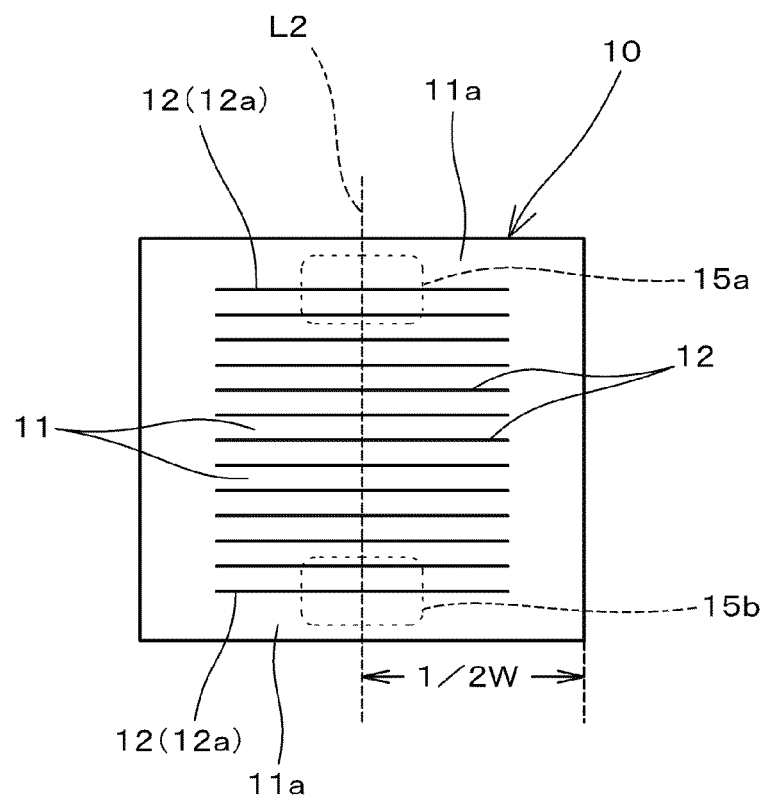
FIG. 5 is a diagram used for explaining a method of inspecting the boundary layer formed between the outermost inner electrode and the outermost dielectric layer in a multilayer ceramic capacitor according to a preferred embodiment of the present invention.

As shown in FIG. 5, a straight line L2 was drawn at a substantially intermediate position of the WT-ground end surface of each test material in the W-direction so as to intersect the inner electrodes 12 at substantially right angles.

Two regions (i.e., boundary layers) located on the upper side and lower side of the WT-plane, in which the boundary between the outermost inner electrode 12a and the outermost dielectric layer 11a located outside the outermost inner electrode 12a intersected the straight line L2 at substantially right angles, that is, an upper boundary region 15a and a lower boundary region 15b shown in FIG. 5, were observed using a scanning electron microscope with a magnification of 10,000 times. In this preferred embodiment, the width of the field of view was set to about 10 μm, for example.

The observations of the upper boundary region 15a and the lower boundary region 15b were made using six samples prepared for each of the test materials shown in Tables 1A and 1B. For each sample, the above-described two regions were observed. Thus, Table 1A and 1B show the results of the observations made at 12 positions (=6 samples×2 regions).

Figure 6:
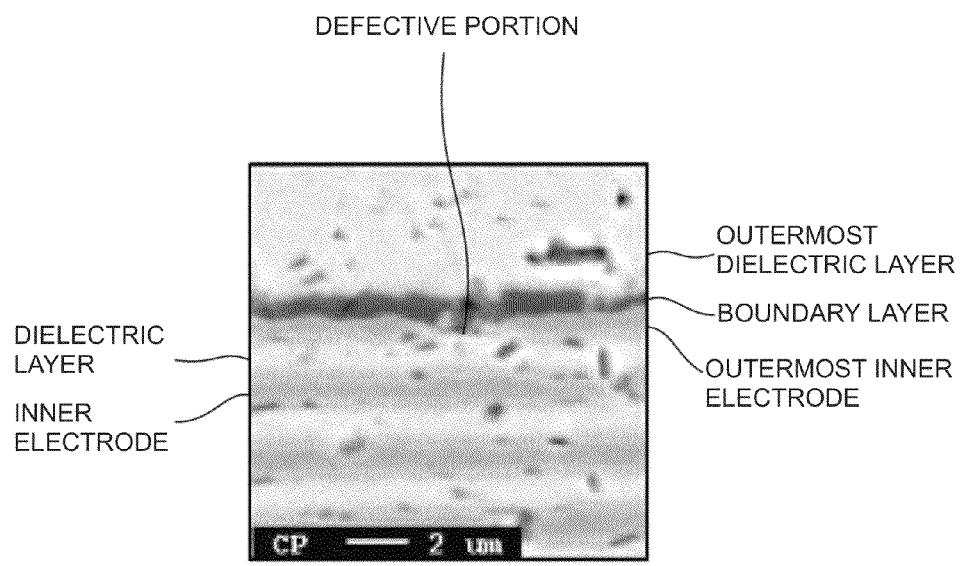
FIG. 6 illustrates a backscattered electron image of an upper boundary region of a multilayer ceramic capacitor according to a preferred embodiment of the present invention, which is formed by FE-WDX.
Figure 7:
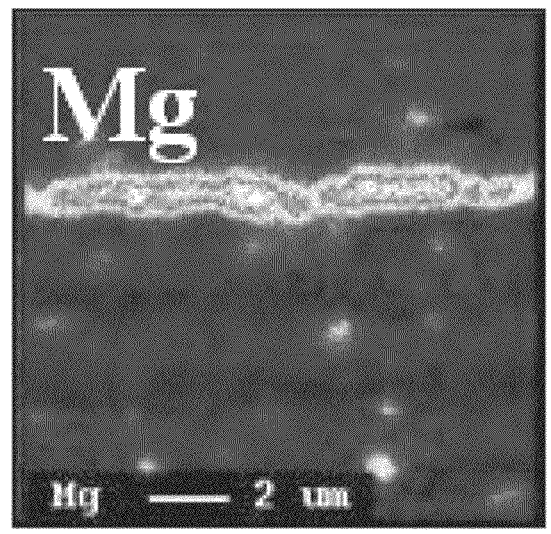
FIG. 7 illustrates an image obtained by mapping Mg in an upper boundary region of a multilayer ceramic capacitor according to a preferred embodiment of the present invention.
Figure 10A:
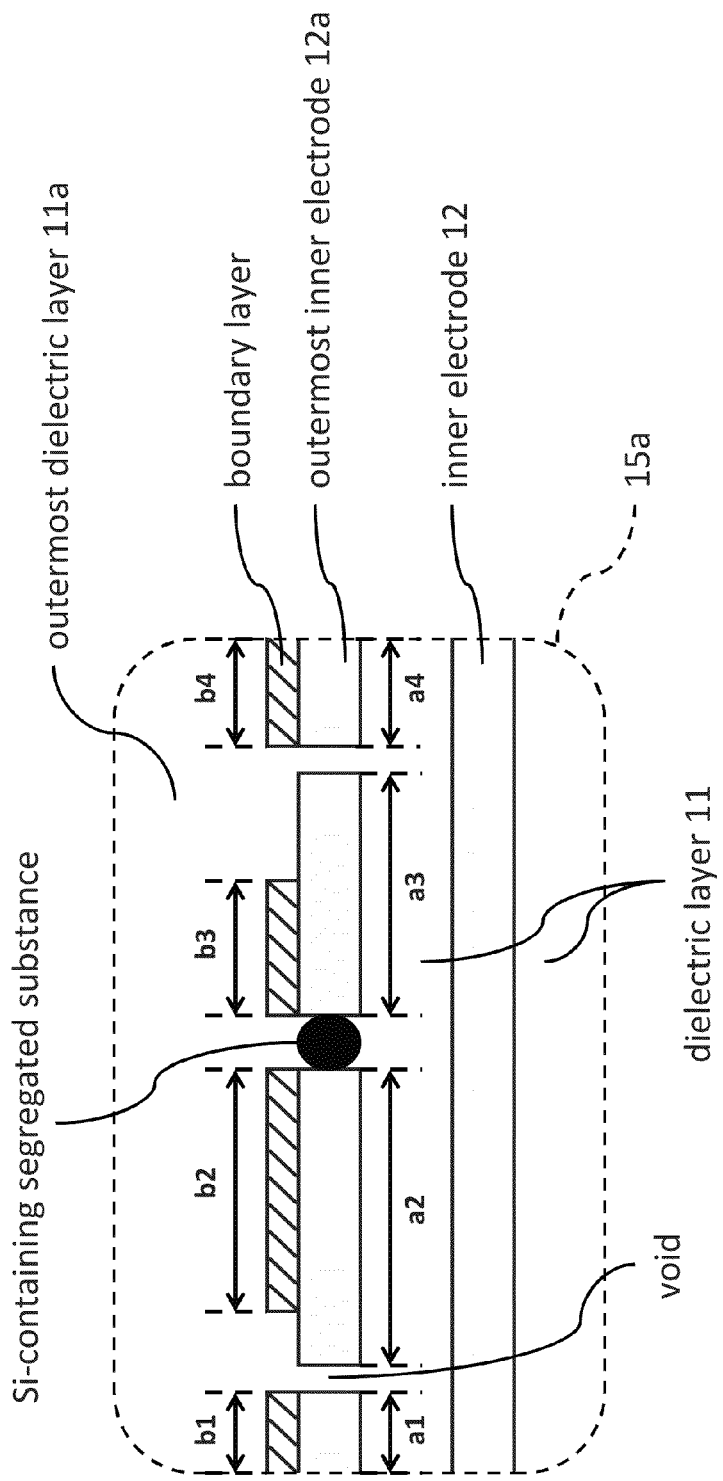
FIGS. 10A-10C are enlarged views of an upper boundary region shown in FIG. 5.
Figure 10B:
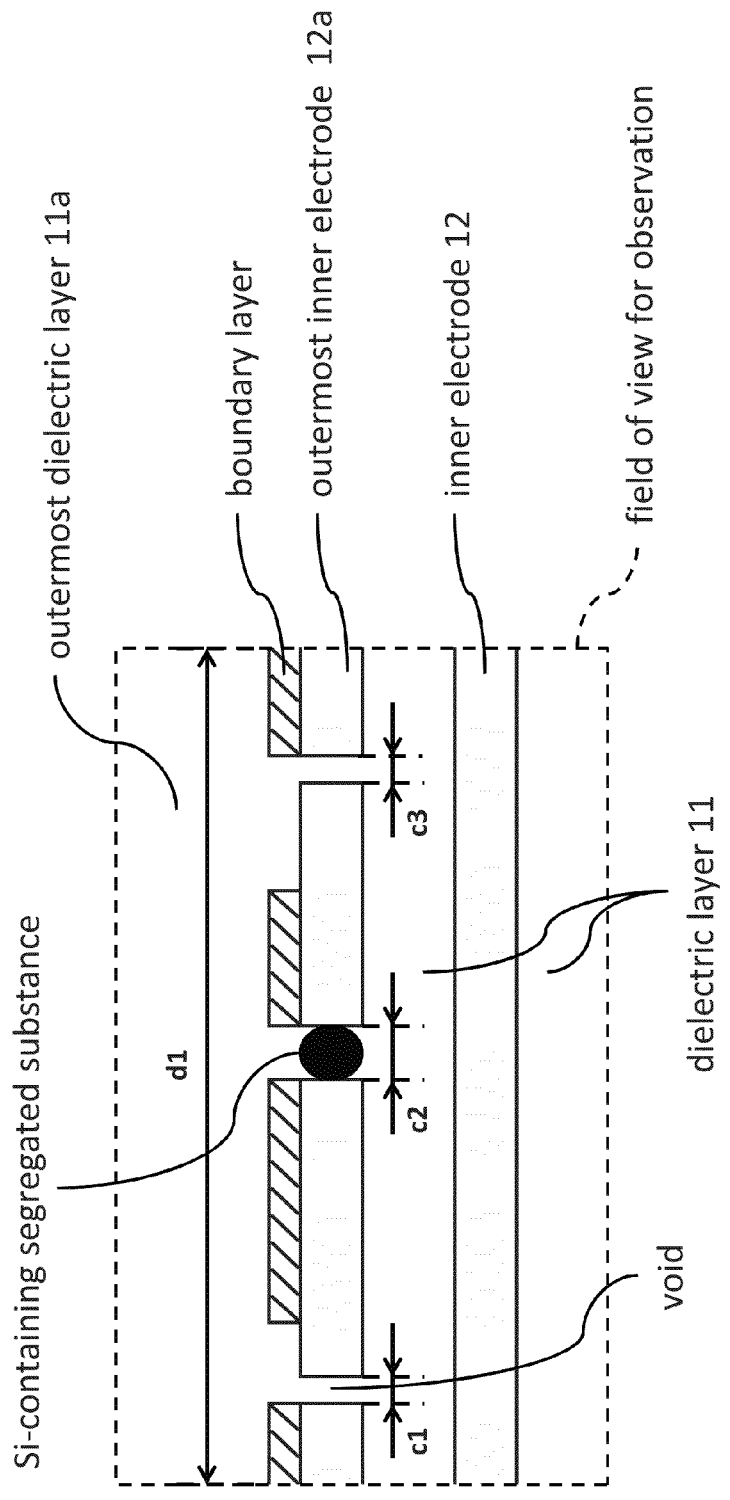
Figure 10C:
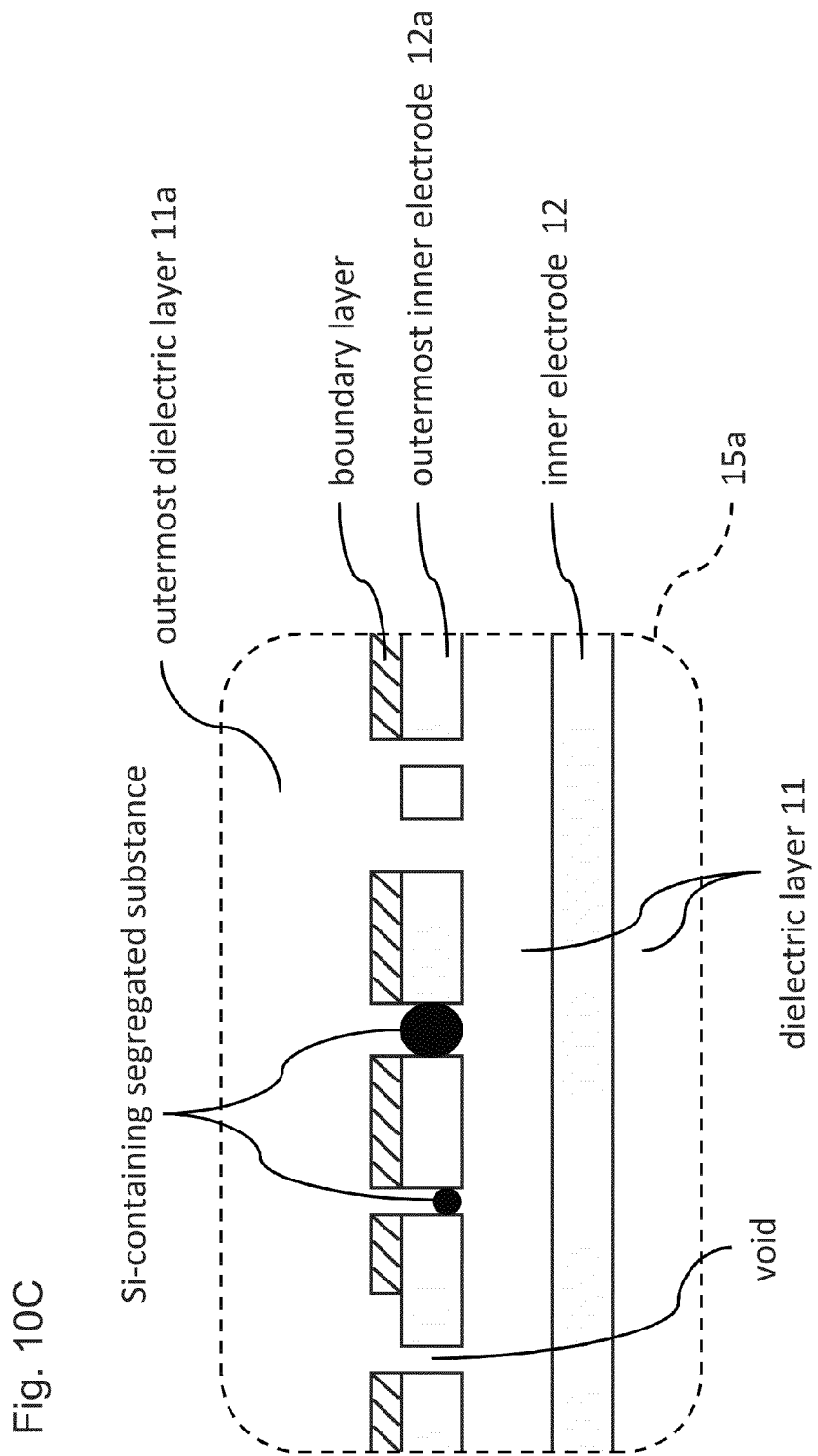

The observation of the boundary layers was made by FE-WDX. FIG. 6 illustrates a backscattered electron image of the upper boundary region 15a and FIGS. 10A-10C are blown-up schematic views of the upper boundary region 15a of Test material No. 16 shown in Table 1B, which is formed by FE-WDX. FIG. 7 illustrates an image obtained by mapping Mg contained in the same region of Test material No. 16 as shown in the backscattered electron image of FIG. 6.

FIGS. 6 and 7 show that Mg was present at the interface between the outermost inner electrode 12a located in the upper boundary region 15a and the outermost dielectric layer 11a located outside the outermost inner electrode 12a.

In a similar manner, it was also confirmed that Mn was present at the interface between the outermost inner electrode 12a located in the lower boundary region 15b and the outermost dielectric layer 11a although the image obtained by mapping Mn is not shown.

In this preferred embodiment, the molar ratio (Mn/Mg) of the Mn content to the Mg content in the boundary layer is preferably, but not particularly limited to, about 0.005 to about 0.7, for example. In this case, a multilayer ceramic capacitor having even more superior reliability is obtained. The Mn and Mg contents may be measured, for example, as follows. First, 20 measurement positions that are at about half the depth of the test material in the width direction (W-direction) and at about half the depth of the boundary layer in the thickness direction of the boundary layer are randomly selected in the boundary layer. A thin piece is cut from the boundary layer at each measurement position, and the composition of the thin piece is analyzed using the following apparatuses: an STEM "JEM-2200FS" produced by JEOL Ltd., accelerating voltage: about 200 kV; a detector EDS "JED-2300T" produced by JEOL Ltd.; an SDD detector having an about 60-mm$^2$ aperture; and an EDS system "Noran System 7" produced by Thermo Fisher Scientific K.K. The thickness of each thin piece is set to about 100 nm. The values of Mn/Mg are measured at the respective measurement positions, and the average thereof is calculated.

Figure 8:
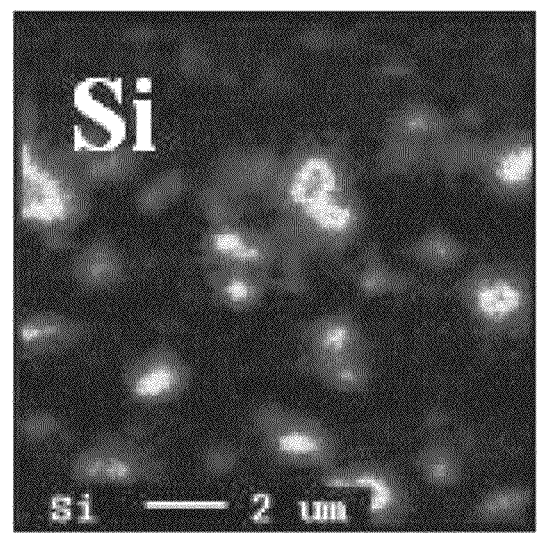
FIG. 8 illustrates an image obtained by mapping Si in an upper boundary region of a multilayer ceramic capacitor according to an embodiment of the present invention.
Figure 9:
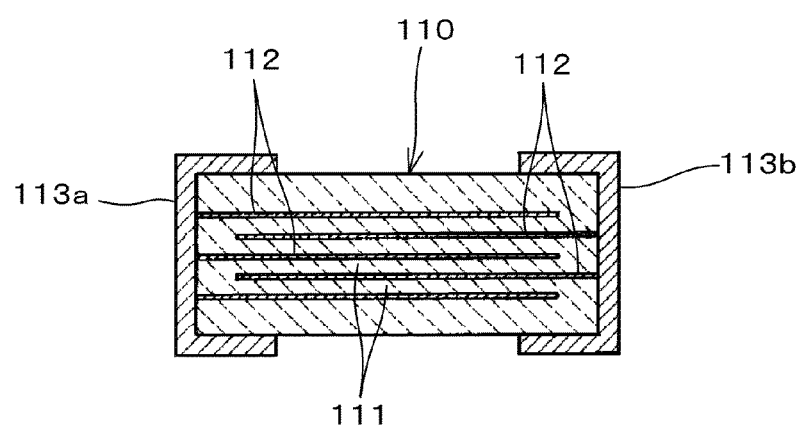
FIG. 9 illustrates the structure of a multilayer ceramic capacitor of the related art.

FIG. 8 illustrates an image obtained by mapping Si in the same region of Test material No. 16 as shown in the backscattered electron image of FIG. 6, which was formed by FE-WDX. FIGS. 8 and 10A-10C show that a Si-containing segregated substance was present in a defective portion in which the continuity of the outermost inner electrode 12a was broken (i.e., discontinuity or discontinuities existed).

The proportion (%) in which the boundary layer was present was calculated from the total length of the boundary layer in which Mg and Mn were present and the length of the outermost inner electrode except for a portion in which the outermost inner electrode was absent due to a void or voids, a Si-containing segregated substance, or other defect using Expression (1) below.

Proportion in which the boundary layer was present (%)=(Total length of the boundary layer in which Mg and Mn were present)/(Length of the outermost inner electrode except for a portion in which the outermost inner electrode was absent due to a void, a Si-containing segregated substance, or other defect)×100     (1)

The proportion in which the boundary layer was present is denoted as P1, and is obtained by the formula P1=X1/X2×100, where X1 represents a total of all of the lengths of the discontinuous portions defining the boundary layer and X2 represents a total of all of the lengths of the discontinuous portions defining the outermost inner electrode 12a. It should be noted, that X1 and X2 do not include lengths of the voids between the discontinuous portions of the boundary layer and the discontinuous portions of the outermost inner electrode 12a. As shown in FIG. 10A, X1=b1+b2+b3+b4 . . . b, and X2=a1+a2+a3+a4 . . . a$_n$.

The proportion in which the boundary layer was present shown in Table 1A or 1B is the average of those measured at the above-described 12 positions.

It is considered that, in this preferred embodiment, the boundary layer including Mg and Mn was formed primarily because Mg and Mn contained in the outermost dielectric layer were diffused into the outermost inner electrode including a conductive component of Ni. In this case, the molar ratio ((Mg+Mn)/Ni) of the total content of Mg and Mn to the Ni content in the boundary layer is preferably, but not limited to, about 0.1 to about 0.8, for example. In this case, a multilayer ceramic capacitor having even more superior reliability is obtained. The contents of Mg, Mn, and Ni may be measured as in the measurement of "Mn/Mg" described above.

(2-2) Continuity of the Outermost Inner Electrodes

The continuity (%) of the outermost inner electrodes was calculated from the total length of portions in which the inner electrode was absent due to a void or voids, a Si-containing segregated substance, or other defects and the width of the field of view for observation (length of the inner electrode) using Expression (2) below. More specifically, as seen in FIG. 10B, the outermost inner electrode 12a extends in a direction parallel or substantially parallel to the upper and lower sides of the field of view for observation, and a dimension d1 from left and right outermost end points of the discontinuous portions defining the outermost inner electrode 12a is equal or substantially equal to the length of the upper and lower sides of the field of view for observation.

Continuity of the outermost inner electrode (%)={1−(Total length of portions in which the outermost inner electrode was absent due to a void, a Si-containing segregated substance, or other defects)/(Length of the outermost inner electrode, i.e., width of the field of view for observation)}×100     (2)

The continuity of the outermost inner electrodes is denoted as P2, and is obtained by the formula $P2=(1-X3/X4)\times 100$, where X3 represents a total of the lengths of portions located along the outermost inner electrode 12a in which the outermost inner electrode 12a is absent and located between the discontinuous portions defining the outermost inner electrode (i.e., a total of the lengths of the voids located along the outermost inner electrode 12a) and X4 represents a dimension between left and right outermost end points of the discontinuous portions defining the outermost inner electrode 12a, which is also d1. As shown in FIG. 10B, $X3=c1+c2+c3\ldots c_n$ and $X4=d1$.

The continuity of the outermost inner electrodes shown in Table 1A or 1B is the average of those measured at the above-described 12 positions.

(2-3) Proportion in which Si-Containing Segregated Substance is Present

The proportion (%) in which a Si-containing segregated substance was present in the boundary layer was calculated based on the relationship between the total number of positions at which the inner electrode was absent and the number of positions at which the inner electrode was absent and Si was present using Expression (3) below.

Proportion in which a Si-containing segregated substance was present (%)=(Number of positions at which the inner electrode was absent and Si was present)/(Total number of positions at which the inner electrode was absent)×100     (3)

The proportion in which a Si-containing segregated substance was present is denoted as P3, and is obtained by the formula $P3=N1/N2\times 100$, where N1 represents the total number of locations along the outermost inner electrode 12a at which the outermost inner electrode 12a is absent (i.e., a void is present) and Si is present in the void, and N2 represents the total number of locations along the outermost inner electrode 12a at which the outermost inner electrode 12a is absent (i.e., a void is present). As shown in FIG. 10C, for example, $N1=2$ and $N2=5$.

The proportion in which a Si-containing segregated substance was present shown in Table 1A or 1B is the average of those measured at the above-described 12 positions.

The Si content in the Si-containing segregated substance is not particularly limited. However, the molar ratio of Si to the other constituents except for oxygen contained in the segregated substance is preferably about 0.3 to about 1.0 on average, for example. The contents of these constituents can be measured by, for example, the following method. First, 20 pieces of the Si-containing segregated substance are randomly selected in the defective portions of the outermost inner electrodes at about half the depth of each test material in the width direction (W-direction). The pieces of the Si-containing segregated substance taken at the respective positions are cut into thin pieces, and the compositions of the thin pieces are analyzed using the following apparatuses: an STEM "JEM-2200FS" produced by JEOL Ltd., accelerating voltage: about 200 kV; a detector EDS "JED-2300T" produced by JEOL Ltd.; an SDD detector having an about 60-mm$^2$ aperture; and an EDS system "Noran System 7" produced by Thermo Fisher Scientific K.K. The thickness of the thin pieces is set to about 100 nm. For each Si-containing segregated substance, the molar ratio of Si to the other constituents except for oxygen contained in the segregated substance is calculated. Then, the average of the calculated molar ratios is obtained. Si may be present in the Si-containing segregated substance in any form, such as in the form of a Si oxide, for example.

[2] Characteristic Evaluations (1) Moisture Resistance Test

Test material Nos. 1 to 18 shown in Tables 1A and 1B were each subjected to moisture resistance tests under two different conditions (i.e., two types of moisture resistance tests) described below. Test material Nos. 15 to 18 were also each subjected to the thermal test described below in order to evaluate the heat resistance of the test material.

(1-1) First Moisture Resistance Test

A first moisture resistance test was conducted using 1500 samples prepared for each of Test material Nos. 1 to 18 shown in Tables 1A and 1B under conditions of about 85° C., about 85% RH, about 4 V, and about 100 h. After the test was finished, the insulation resistance of each sample at room temperature was measured. Samples having an insulation resistance of about 1 MΩ or less were evaluated as failures. Tables 1A and 1B show the results using the ratio (B/A) of the number (B) of samples in which the failure (poor moisture resistance) occurred to the total number (A=1,500) of samples.

(1-2) Second Moisture Resistance Test

A second moisture resistance test was conducted using samples prepared for each of Test material Nos. 7 to 18 shown in Tables 1A and 1B under conditions of about 85° C., about 85% RH, about 6.3 V, and about 100 h. After the test was finished, the insulation resistance of each sample at room temperature was measured. Samples having an insulation resistance of about 1 MΩ or less were evaluated as failures. Tables 1A and 1B show the results using the ratio (B/A) of the number (B) of samples in which the failure (poor moisture resistance) occurred to the total number (A=1,500) of samples.

(2) Thermal Test

Each of Test material Nos. 15 to 18 was subjected to a thermal test in order to evaluate the heat resistance of the test material. In the thermal test, 50 samples prepared for each of Test material Nos. 15 to 18 were immersed in a solder bath at about 325° C. for about 3 minutes. After the test was finished, each sample was covered with a resin and subsequently inspected for occurrences of cracking using a microscope while being ground. Table 1B shows the results.

Table 1B shows the results of the thermal test using the ratio (B/A) of the number (B) of samples in which the failure (poor heat resistance) occurred to the total number (A=50) of samples. In Test material Nos. 15 to 18, the results of the thermal test were all 0/50 since the failure did not occur in any of Test material Nos. 15 to 18.

Table 1A shows that, In Test material Nos. 1 to 6 that did not satisfy the requirements of the present invention regarding the proportion in which the boundary layer was present and the continuity of inner electrodes, a number of failures occurred in the first moisture resistance test, that is, sufficient reliability was not produced. The second moisture resistance test was omitted for Test material Nos. 1 to 6, in which poor results were observed in the first moisture resistance test.

In contrast, in Test material Nos. 7 to 18 shown in Tables 1A and 1B that satisfied the requirements of preferred embodiments of the present invention regarding the proportion in which the boundary layer was present and the continuity of inner electrodes, good results were obtained in the moisture resistance tests.

In Test material Nos. 15 to 18 in which the thickness of the inner electrodes was set within the range of about 0.2 to about 0.4 μm, for example, cracking was not observed in the thermal test.

It was also confirmed that, among Test material Nos. 7 to 18 that satisfy the requirements of the present invention, in particular, test materials in which the Si-containing segregated substance was present in about 39% or more of the defective portion in which the continuity was broken were multilayer ceramic capacitors having particularly high moisture resistance.

In Test material Nos. 7, 8, 13, 15, and 17 in which the Si-containing segregated substance was present in less than about 39% of the defective portion in which the continuity was broken, a small reduction in moisture resistance was observed in the second moisture resistance test.

Thus, for the above-described reason, the proportion in which the Si-containing segregated substance is present in the defective portion in which the continuity is broken is preferably about 39% or more, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a ceramic multilayer body including:
a plurality of dielectric ceramic layers; and
a plurality of inner electrodes stacked such that a respective one of the plurality of dielectric ceramic layers is interposed between an adjacent pair of the plurality of inner electrodes; and
an outer electrode disposed on the ceramic multilayer body so as to be electrically connected to respective ones of the plurality of inner electrodes;
wherein the plurality of dielectric ceramic layers include a perovskite-type compound including Ba and Ti;
a boundary layer including Mg and Mn is provided between an outermost inner electrode of the plurality of inner electrodes and an outermost dielectric ceramic layer of the plurality of dielectric ceramic layers, the outermost inner electrode being located at an outermost position of the plurality of inner electrodes in a direction in which the plurality of inner electrodes are stacked, the outermost dielectric ceramic layer being located outside of the outermost inner electrode; wherein a proportion P1 obtained by a formula $P1=X1/X2\times100$ is about 69% or more, where X1 represents a total of all lengths of discontinuous portions defining the boundary layer, and X2 represents a total of all lengths of discontinuous portions defining the outermost inner electrode.

2. A multilayer ceramic capacitor comprising:
a ceramic multilayer body including:
a plurality of dielectric ceramic layers; and
a plurality of inner electrodes stacked such that a respective one of the plurality of dielectric ceramic layers is interposed between an adjacent pair of the plurality of inner electrodes; and
an outer electrode disposed on the ceramic multilayer body so as to be electrically connected to respective ones of the plurality of inner electrodes;
wherein the plurality of dielectric ceramic layers include a perovskite-type compound including Ba and Ti;
a boundary layer including Mg and Mn is provided between an outermost inner electrode of the plurality of inner electrodes and an outermost dielectric ceramic layer of the plurality of dielectric ceramic layers, the outermost inner electrode being located at an outermost position of the plurality of inner electrodes in a direction in which the plurality of inner electrodes are stacked, the outermost dielectric ceramic layer being located outside of the outermost inner electrode;
wherein a proportion P2 obtained by a formula $P2=(1-X3/X4)\times100$ is about 60% or more, where X3 represents a total of lengths of portions located along the outermost inner electrode in which the outermost inner electrode is absent and located between the discontinuous portions defining the outermost inner electrode, and X4 represents a dimension between left and right outermost end points of the discontinuous portions defining the outermost inner electrode.

3. The multilayer ceramic capacitor according to claim 1, wherein a proportion P3 obtained by a formula $P3=N1/N2\times100$ is about 39% or more, where N1 represents a total number of locations at which the outermost inner electrode is absent and Si is present, and N2 represents a total number of locations at which the outermost inner electrode is absent.

4. A multilayer ceramic capacitor comprising:
a ceramic multilayer body including:
a plurality of dielectric ceramic layers; and
a plurality of inner electrodes stacked such that a respective one of the plurality of dielectric ceramic layers is interposed between an adjacent pair of the plurality of inner electrodes; and
an outer electrode disposed on the ceramic multilayer body so as to be electrically connected to respective ones of the plurality of inner electrodes;
wherein the plurality of dielectric ceramic layers include a perovskite-type compound including Ba and Ti;
a boundary layer including Mg and Mn is provided between an outermost inner electrode of the plurality of inner electrodes and an outermost dielectric ceramic layer of the plurality of dielectric ceramic layers, the outermost inner electrode being located at an outermost position of the plurality of inner electrodes in a direction in which the plurality of inner electrodes are stacked, the outermost dielectric ceramic layer being located outside of the outermost inner electrode;
wherein a proportion P1 obtained by a formula $P1=X1/X2\times100$ is about 69% or more, where X1 represents a total of all lengths of discontinuous portions defining the boundary layer, and X2 represents a total of all lengths of discontinuous portions defining the outermost inner electrode;

a proportion P2 obtained by a formula P2=(1−X3/X4)×100 is about 60% or more, where X3 represents a total of lengths of portions located along the outermost inner electrode in which the outermost inner electrode is absent and located between the discontinuous portions defining the outermost inner electrode, and X4 represents a dimension between left and right outermost end points of the discontinuous portions defining the outermost inner electrode; and a proportion P3 obtained by a formula P3=N1/N2×100 is about 39% or more, where N1 represents a total number of locations at which the outermost inner electrode is absent and Si is present, and N2 represents a total number of locations at which the outermost inner electrode is absent.

5. The multilayer ceramic capacitor according to claim 4, wherein an average thickness of each of the inner electrodes is about 0.4 μm or less.

6. The multilayer ceramic capacitor according to claim 4, wherein an average thickness of each of the dielectric ceramic layers is about 0.5 μm or less.

7. A multilayer ceramic capacitor comprising:
a ceramic multilayer body including:
a plurality of dielectric ceramic layers; and
a plurality of inner electrodes including Ni and being stacked such that a respective one of the plurality of dielectric ceramic layers is interposed between an adjacent pair of the plurality of inner electrodes; and
an outer electrode disposed on the ceramic multilayer body so as to be electrically connected to respective ones of the plurality of inner electrodes; wherein
the dielectric ceramic layers include a perovskite-type compound including Ba and Ti;
a boundary layer including Mg, Mn and Ni is provided between an outermost inner electrode of the plurality of inner electrodes and an outermost dielectric ceramic layer of the plurality of dielectric ceramic layers, the outermost inner electrode being located at an outermost position of the plurality of inner electrodes in a direction in which the plurality of inner electrodes are stacked, the outermost dielectric ceramic layer being located outside the outermost inner electrode;
a proportion P1 obtained by a formula P1=X1/X2×100 is about 69% or more, where X1 represents a total of all lengths of discontinuous portions defining the boundary layer, and X2 represents a total of all lengths of discontinuous portions defining the outermost inner electrode;
a proportion P2 obtained by a formula P2=1−X3/X4)×100 is about 60% or more, where X3 represents a total of lengths of portions located along the outermost inner electrode in which the outermost inner electrode is absent and located between the discontinuous portions defining the outermost inner electrode, and X4 represents a dimension between left and right outermost end points of the discontinuous portions defining the outermost inner electrode;
a molar ratio (Mn/Mg) of the Mn content to the Mg content in the boundary layer is in a range of about 0.005 to about 0.7; and
a molar ratio ((Mg+Mn)/Ni) of the total content of Mg and Mn to the Ni content in the boundary layer is in a range of about 0.1 to about 0.8.

8. The multilayer ceramic capacitor according to claim 7, wherein a proportion P3 obtained by a formula P3=N1/N2×100 is about 39% or more, where N1 represents a total number of locations at which the outermost inner electrode is absent and Si is present, and N2 represents a total number of locations at which the outermost inner electrode is absent.

9. The multilayer ceramic capacitor according to claim 7, wherein an average thickness of each of the inner electrodes is about 0.4 μm or less.

10. The multilayer ceramic capacitor according to claim 7, wherein an average thickness of each of the dielectric ceramic layers is about 0.5 μm or less.

11. A multilayer ceramic capacitor comprising:
a ceramic multilayer body including:
a plurality of dielectric ceramic layers; and
a plurality of inner electrodes stacked such that a respective one of the plurality of dielectric ceramic layers is interposed between an adjacent pair of the plurality of inner electrodes; and
an outer electrode disposed on the ceramic multilayer body so as to be electrically connected to respective ones of the plurality of inner electrodes; wherein
a boundary layer including Mg and Mn is provided between an outermost inner electrode of the plurality of inner electrodes and an outermost dielectric ceramic layer of the plurality of dielectric ceramic layers, the outermost inner electrode being located at an outermost position of the plurality of inner electrodes in a direction in which the plurality of inner electrodes are stacked, the outermost dielectric ceramic layer being located outside the outermost inner electrode;
a proportion P1 obtained by a formula P1=X1/X2×100 is about 69% or more, where X1 represents a total of all lengths of discontinuous portions defining the boundary layer, and X2 represents a total of all lengths of discontinuous portions defining the outermost inner electrode;
a proportion P2 obtained by the formula P2=(1−X3/X4)×100 is about 60% or more, where X3 represents a total of lengths of portions located along the outermost inner electrode in which the outermost inner electrode is absent and located between the discontinuous portions defining the outermost inner electrode, and X4 represents a dimension between left and right outermost end points of the discontinuous portions defining the outermost inner electrode;
at least one of the plurality of dielectric ceramic layers other than the outermost dielectric ceramic layer includes a perovskite-type compound including Ba and Ti, and further including a rare earth element R, Mn, Mg, V, and Al; and
contents of R, Mn, Mg, V, Al relative to 100 molar parts of Ti are set such that:
a content a of R in molar parts is about $0.7 \le a \le about\ 1.1$;
a content b of Mn in molar parts is about $0.07 \le b \le about\ 0.18$;
a content c of Mg in molar parts is about $1.0 \le c \le about\ 1.7$;
a content d of V in molar parts is about $0.07 \le d \le about\ 0.18$; and
a content e of Al in molar parts is about $0.26 \le e \le about\ 0.52$.

12. The multilayer ceramic capacitor according to claim 11, wherein
the plurality of inner electrodes include Ni;
the boundary layer includes Mg, Mn and Ni;
a molar ratio (Mn/Mg) of the Mn content to the Mg content in the boundary layer is in a range of about 0.005 to about 0.7; and
a molar ratio ((Mg+Mn)/Ni) of the total content of Mg and Mn to the Ni content in the boundary layer is in a range of about 0.1 to about 0.8.

13. The multilayer ceramic capacitor according to claim 12, wherein a proportion P3 obtained by a formula P3=N1/

$N2\times100$ is about 39% or more, where N1 represents a total number of locations at which the outermost inner electrode is absent and Si is present, and N2 represents a total number of locations at which the outermost inner electrode is absent.

14. The multilayer ceramic capacitor according to claim 12, wherein an average thickness of each of the inner electrodes is about 0.4 μm or less.

15. The multilayer ceramic capacitor according to claim 12, wherein an average thickness of each of the dielectric ceramic layers is about 0.5 μm or less.

* * * * *